No. 811,363. PATENTED JAN. 30, 1906.
G. BINDER.
SUPPORT FOR CENTRIFUGAL EXTRACTORS.
APPLICATION FILED MAR. 25, 1904.

2 SHEETS—SHEET 1.

WITNESSES:
W. H. Canby
M. M. Hamilton

INVENTOR
Gottlob Binder
BY
Ναeding & Haeding
ATTORNEYS

No. 811,363. PATENTED JAN. 30, 1906.
G. BINDER.
SUPPORT FOR CENTRIFUGAL EXTRACTORS.
APPLICATION FILED MAR. 25, 1904.
2 SHEETS—SHEET 2.
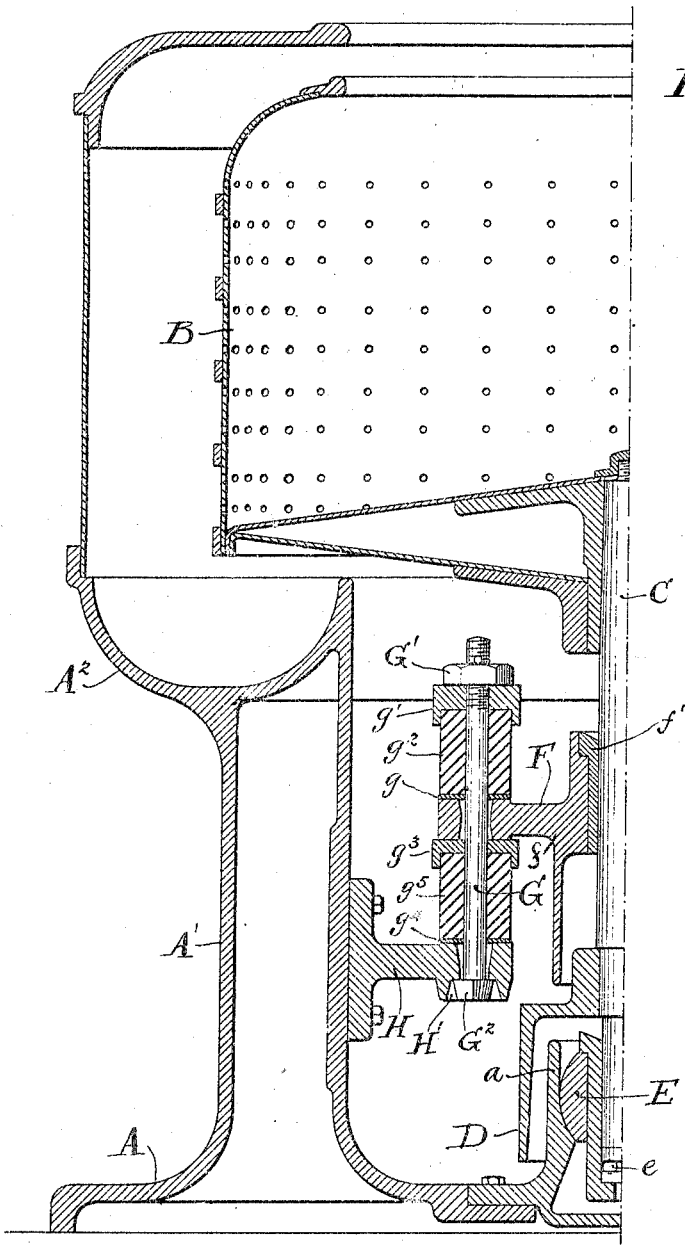
Fig. 3.
WITNESSES:
Fig. 4.
INVENTOR
Gottlob Binder
BY
Harding & Harding
ATTORNEYS

UNITED STATES PATENT OFFICE.

GOTTLOB BINDER, OF PHILADELPHIA, PENNSYLVANIA, ASSIGNOR TO THE BARNES AND ERB COMPANY, OF PHILADELPHIA, PENNSYLVANIA, A CORPORATION OF WEST VIRGINIA.

SUPPORT FOR CENTRIFUGAL EXTRACTORS.

No. 811,363.

Specification of Letters Patent.

Patented Jan. 30, 1906.

Application filed March 25, 1904. Serial No. 199,984.

*To all whom it may concern:*

Be it known that I, GOTTLOB BINDER, a citizen of the United States, residing at Philadelphia, county of Philadelphia, and State of Pennsylvania, have invented a new and useful Improvement in Supports for Centrifugal Extractors, of which the following is a full, clear, and exact description, reference being had to the accompanying drawings, which form a part of this specification.

My invention has for its object a new and improved support for the spindle by which the basket is rotated, so that the spindle is supported, even though it may move or tend to move out of a vertical line, due to the unequal loading of the basket.

I will first describe the embodiment of my invention illustrated in the accompanying drawings, in which—

Figure 1:
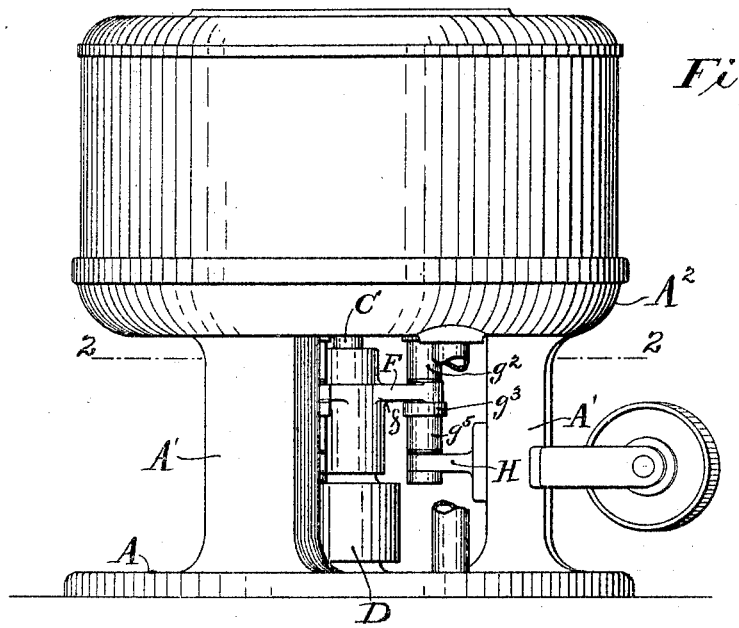
Figure 2:
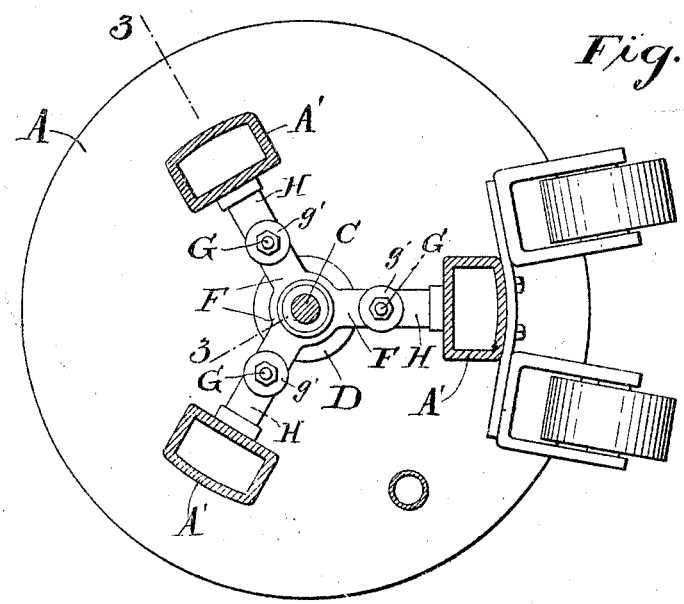

Figure 1 is a front elevation of my machine with a section broken out of the drain-pipe. Fig. 2 is a sectional plan taken on line 2 2, Fig. 1. Fig. 3 is an enlarged sectional elevation taken on the line 3 3, Fig. 2. Fig. 4 is a detail showing the bracket and bolt-head.

A is the base, from which project the legs A', supporting the curb A², which curb surrounds the basket B, which basket is constructed in the usual manner and supported or carried on the end of the spindle C. The spindle passes through the driving-pulley D, with which it makes a rotatable fit. The lower end of the spindle rests upon the balls $e$ and in the ball E, which ball E is seated in a projection $a$ from the base A.

F represents the arms of a spider, having the bearing ends $f$, interposed between which bearing ends and the spindle C is the bronze bushing $f'$. The outer ends of each of the arms F of the spider have above them the washer $g$, between which and the washer $g'$ is the spring $g^2$. Below the spider is the washer $g^3$, between which and the washer $g^4$ is the spring $g^5$. Through the spider-arm, the washers $g'$ $g$, spring $g^2$, washer $g^3$, washer $g^4$, and spring $g^5$ extends the bolt or guiding device G, which is threaded at its upper end. The orificed portion of the washer $g'$ is also threaded and turns on the threaded portion of bolt G. A lock-nut G' is secured to the bolt above the washer $g'$. The bolt also passes through the arm of a support or bracket H, projecting from the leg A', and has the head G² in the square pocket H' cast with the bracket. In practice I use three spider-arms with guiding devices and connections, as described, equispaced around the spindle.

As may be seen, in this construction both the spider and its arms and bearings on the spindle are integral with each other, so that with any movement of the spindle from the vertical a corresponding movement is given to the spider-arms, causing an action either upon the upper spring $g^2$ or the lower spring $g^5$. As may be seen, the movement of the spindle causes an action upon one or the other of the springs by each of the spider-arms. Thus if the spindle turns to move to the right the right-hand arm of the spider, as shown in the drawings, will tend to compress the spring $g^5$, while the spider-arm on the left will tend to compress the spring $g^2$. This mode of operation is facilitated by making the bearing of the spider on the spindle a cylindrical one, thereby maintaining constant the angle of divergence of the spider from the spindle, so that as the spindle tilts from the vertical the outer end of the arms will move up or down. In practice this construction tends to maintain the equilibrium of the spindle with great certainty. As may be seen, the bearing end $f$ of the spider is prolonged upward and downward a distance sufficient to overlap the springs $g^2$ and $g^5$, this construction being effective to prevent oil in the bearing from flying upon the rubbers or springs, which would tend to corrode them. By prolonging these bearings $f$, as described, they cover the springs, so that this danger of the oil passing to them is obviated.

In practice the springs $g^2$ and $g^5$ are preferably made of rubber, although they may be made in the form of a coil-spring or any other desired shape.

Having now fully described my invention, what I claim, and desire to protect by Letters Patent, is—

1. In a support for centrifugal extractor, in combination, the basket-spindle, a spider comprising a plurality of projecting arms, and having a bearing on the spindle adapted to maintain substantially constant the angle of divergence of the spider and the spindle, a guiding device for each arm along which the outer end of the latter is adapted to move, and a yielding device above and a yielding device below each of said arms, whereby, in the angular movement of the spindle, the arm acts on one or the other of the corresponding yielding devices.

2. In a support for centrifugal extractor, in combination, the basket-spindle, a spider having an inner cylindrical bearing end to maintain substantially constant the angle of divergence of the spider from the spindle, said spider comprising a plurality of projecting arms, a guiding device for each arm which the outer end of the arm engages, and a pair of yielding devices, one above and one below each of said arms, whereby, in the angular movement of the spindle, the spider acts on the lower yielding device only of one pair and the upper yielding device only of another pair.

3. In a support for centrifugal extractor, in combination, the basket-spindle, a spider having a bearing on the spindle and comprising a plurality of projecting arms, a guiding device for each arm, a support for the lower end of each guiding device, the arm loosely surrounding the guiding device substantially midway between its ends, a yielding device above each arm, means to hold the same from vertical bodily movement, and a yielding device between each arm and the support.

4. In a support for centrifugal extractor, in combination, the basket-spindle, a spider having a bearing on the spindle and comprising a plurality of projecting arms, a bolt supporting the outer end of each arm, a support for the lower end of each bolt, a washer on the bolt above the support, a spring on the bolt above said washer, a second washer on said bolt above said spring, the outer end of the arm surrounding the bolt above said second washer, a third washer on the bolt above the arm, a second spring on the bolt above said third washer, a fourth washer on the bolt above said second spring, and a nut on the bolt above said fourth washer.

5. In a support for centrifugal extractor, in combination, a base, the basket-spindle, supported at its lower end on the base so as to be free to oscillate thereon, the spindle being confined from angular movement at no other point, a spider having a bearing on the basket-spindle adapted to maintain constant the angle of divergence of the spider from the spindle, said spider comprising a plurality of projecting arms, a guiding device for the outer end of each arm secured to the base so as to be capable of oscillating thereon, and a pair of tension devices on each guiding device, one above and one below the corresponding arm, whereby, in the angular movement of the spindle, an arm acts on one or the other of its corresponding tension devices and the capacity for oscillation of the basket is limited only by the yielding capacity of the tension devices.

In testimony of which invention I have hereunto set my hand, at Philadelphia, on this 19th day of March, 1904.

GOTTLOB BINDER.

Witnesses:
FREDERICK M. PILE,
HENRY C. BROWN.